2,981,702
Patented Apr. 25, 1961

2,981,702
CURABLE EPOXY PHENOL ALDEHYDE-ALIPHATIC POLYEPOXIDE COMPOSITIONS

William E. St. Clair, Pittsburgh, and Roy H. Moult, Butler, Pa., assignors to Koppers Company, Inc., a corporation of Delaware No Drawing. Filed Jan. 13, 1958, Ser. No. 708,384

6 Claims. (Cl. 260—19)

This invention relates to compositions which cure at room temperatures to tough, insoluble, infusible resinous materials useful as adhesives, surface coatings and castings.

It has been known heretofore that epoxy resins can be cross-linked with liquid amines to form tough, infusible, resinous materials, however the reaction is so fast that the material does not have a pot life long enough for practical use. It has now been discovered that the above epoxy compounds can be cross-linked with solid polyamines at room temperature to form an infusible, insoluble resin. The composition in accordance with this invention has much greater utility in that the pot life of the mixture (the length of time during which the mixture can be used or applied after the mixture is formed) is much longer than compositions containing liquid polyamine curing agents.

It is among the objects of the present invention, therefore, to provide a composition as an adhesive, casting composition, potting compound and the like containing a fusible epoxy alkoxy phenol aldehyde resin, an aliphatic polyepoxide and a solid polyamine curing agent.

A further object is to provide a composition which is curable at room temperature and possesses a practical pot life.

Another object of the invention is to provide compositions which cure to a hard tough infusible resin which are new and useful.

The compositions of the present invention are particularly useful as adhesives for joining wood, glass, metals, etc. together.

The cured resin exhibits high adhesion, high tensile strength and resistance to high temperatures, moisture, solvents and chemicals.

The compositions comprise a fusible epoxy alkoxy phenol aldehyde resin, a solid polyamine, an aliphatic polyepoxide, and preferably contain a plasticizer to impart flexibility to the cured composition. Solvents and fillers may also be present.

Adhesives prepared according to the present invention are superior to prior art cold setting adhesives, particularly for joining metals, in that they have practical pot lives, and yet set within 24 hours to a high strength resin. The latter feature is of particular importance, for the clamps may be removed from the work after 24 hours without danger of damage to the adhesive bond. The adhesives cure to maximum strength in about 5 days.

The polyepoxy resins of the subject invention are described in U.S. Patents 2,658,884 and 2,658,885 and the application of Mr. W. E. St. Clair filed concurrently herewith and may be represented by the formula described fully hereinafter.

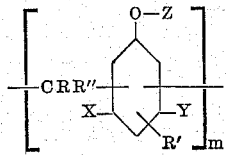

wherein R and R″ can be the same or different and are substituents selected from the group consisting of a hydrogen, alkyl, alkylene, aryl, aralkyl, alkaryl, cycloalkyl and furyl groups; X and Y are substituents selected from the group consisting of a hydrogen, a halogen, alkyl and hydroxyl groups; R′ is a substituent selected from the group consisting of a hydrogen, a halogen, alkyl, aryl, aralkyl and alkaryl groups; $m$ is an integer having a value of at least three; Z is a substituent selected from the group consisting of a hydrogen and an epoxyalkyl group. At least three of said substituents in the polymeric chain being epoxyalkyl groups.

The resinous polymer has a molar ratio of epoxy group to phenolic nucleus of at most one.

These polyepoxy alkoxy phenolic aldehyde resins of the subject invention, so called polyepoxides, are distinguished from di-epoxides in that the functionality or epoxide equivalency is dependent upon the number of phenolic hydroxyl groups available for etherification and therefore on the molecular weight of the phenolic aldehyde resin. The phenolic aldehyde resin must contain at least 3 and preferably at least 5 phenolic groups per molecule. It will be appreciated that the average functionality will be considerably higher than the difunctionality of the di-epoxides.

Both the polyepoxy alkoxy phenolic aldehyde resins of the subject invention and the di-epoxides of the prior art will react with compounds containing reactive hydrogen atoms which will condense with oxirane oxygen groups, described herein as curing agents, to form higher molecular weight compositions. With curing agents containing two reactive centers, the resins of the prior art tend to form long chain linear condensates. The resins of the subject invention on the other hand because of the plurality of epoxy groups in an average molecule readily react with difunctional curing agents to form closely knit three dimensional structures.

The compositions may also include solvents, plasticizers, elastomers, and fillers. The curing agents react with this composition at room temperature to form a tough, inert, insoluble, infusible cured polymer. Accordingly, the products of the invention should be made up in the form of a two component system, one component containing the curing agent and the other component the resin. The solvents, fillers, etc. are inert and may therefore be present in either the resin part or in the curing agent part in any proportion.

The polyepoxy alkoxy phenolic aldehyde resins useful in the invention include resins such as described in U.S. Patents 2,658,884 and 2,658,885 which comprise the reaction product of a fusible alkylphenolic aldehyde resin, prepared by reacting an alkylphenol with from 0.5–0.8 mol of an aldehyde or ketone, with a haloepoxy alkane; and fusible chlorophenolic aldehyde resins reacted with a haloepoxy alkane. Additional resins include those prepared by reacting fusible unsubstituted phenol aldehyde resins etherified with a haloepoxy alkane. The resins further include polyepoxy alkoxy phenolic aldehyde resins prepared from fusible ortho or para-substituted phenolic aldehyde resins containing higher amounts of aldehyde per mol of phenol. The latter resins are more fully described in an application of William E. St. Clair filed concurrently herewith.

Hydrocarbon-substituted phenols, having two available positions, ortho or para, to a phenolic hydroxy group which give fusible resins suitable for the preparation of the epoxyalkoxy aryl resins include C- and p-cresole, o- and p-ethyl phenols, o- and p-isopropyl phenols, o- and p-tert butyl phenols, o- and p-sec-butyl phenols, o- and p-amyl phenols, o- and p-octyl phenols, o- and p-nonyl phenols, etc., 2,5-xylenol, 3,4-xylenol, 2,5-diethyl phenol, 3,4-diethyl phenol, 2,5-diisopropyl phenol, 4- methyl resorcinol, 4-ethyl resorcinol, 4-isopropyl resorcinol, 4-tert-butyl resorcinol, etc., o- and p-benzyl phenyl, o- and p-phenethyl phenols, o- and p-phenyl phenols, o- and p-tolyl phenols, o- and p-xylyl phenols, o- and p-cyclohexyl phenols, o- and p-cyclopentyl phenols, etc., 4-phenethyl resorcinol, 4-tolyl resorcinol, and 4-cyclohexyl resorcinol.

Various chloro-substituted phenols which can also be used in the preparation of phenol aldehyde resins suitable for the preparation of the epoxyalkoxy aryl resins include o- and p-chloro-phenols, 2,5-dichloro-phenol, 2,3-dichloro-phenol, 3,4-dichloro-phenol, 2-chloro-3-methyl-phenol, 2-chloro-5-methyl-phenol, 3-chloro-2-methyl-phenol, 5-chloro-2-methyl-phenol, 3-chloro-4-methyl-phenol, 4-chloro-3-methyl-phenol, 4-chloro-3-ethyl-phenol, 4-chloro-3-isopropyl-phenol, 3-chloro-4-phenyl-phenol, 3-chloro-4-chloro-phenyl-phenol, 3,5-dichloro-4-methyl-phenol, 3,5-dichloro-5-methyl-phenol, 3,5-dichloro-2-methyl-phenol, 2,3-dichloro-5-methyl-phenol, 2,5-dichloro-3-methyl-phenol, 3-chloro-4,5-dimethyl-phenol, 4-chloro-3,4-dimethyl-phenol, 2-chloro-3,5-dimethyl-phenol, 5-chloro-2,3-dimethyl-phenol, 5-chloro-2,3-dimethyl-phenol, 5-chloro-3,4-dimethyl-phenol, 2,3,5-trichloro-phenol, 3,4,5-trichloro-phenol, 4-chloro-resorcinol, 4,5-dichloro-resorcinol, 4-chloro-5-methyl-resorcinol, and 5-chloro-4-methyl-resorcinol.

Typical phenols which have more than two positions that are ortho or para to a phenolic hydroxy group, and are, consequently, available for condensation and which, by controlled condensation, can also be used to give fusible resins suitable for the preparation of polyepoxy alkoxy aryl resins which in turn are satisfactory for use in the present invention are: phenol, m-cresol, 3,5-sylenol, m-ethyl and m-isopropyl phenols, m.m'-diethyl and diisopropyl phenols, m-butyl phenols, m-amyl phenols, m-octyl phenols, m-nenyl phenols, resorcinol, 5-methyl-resorcinol, 5-ethyl resorcinol, etc.

As condensing agents can be used any carbonyl containing compounds which will condense with the particular phenol being used, such agents including formaldehyde, acetaldehyde, propionaldehyde, butyraldehyde, heptaldehyde, cyclohexanone, methyl cyclohexanone, cyclopentanone, benzaldehyde, and nuclear alkyl-substituted, benzaldehyde, such as toluic aldehyde, etc. naphthaldehyde, furfuraldehyde, glyoxal, acrolein, etc., or compounds capable of engendering aldehydes such as para-formaldehyde, hexamethylene tetramine, etc. The aldehydes or ketones can also be used in the form of a solution, for example the commercially available formalin.

While glycidyl ethers, such as derived from epichlorohydrin, are particularly useful in the practice of this invention, the epoxyalkoxy aryl resins containing epoxyalkoxy groups of a greater number of carbon atoms are also suitable. These are prepared by substituting for epichlorohydrin such representative corresponding chlorides or bromides of epoxyalkanes such as 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxy-pentane, 2-chloromethyl-1,2-epoxybutane, 1-bromo-4-ethyl-2,3-epoxypentane, 4-chloro-2-methyl-2,3-epoxypentane, 1-chloro-2,3-epoxyoctane, 1-chloro-2-methyl-2,3-epoxyoctane, or 1-chloro-2,3-epoxydecane.

The number of glycidyl or other epoxyalkyl groups to be added depends on the properties desired in the final product. Satisfactory properties are often attained when much less than complete substitution of epoxyalkoxy groups for hydroxy groups is effected. With the higher molecular weight phenolic aldehyde resins, it is often desirable to have only a portion of the hydroxy groups replaced with epoxy containing alkyl chains and to maintain some hydroxy groups free for further reaction. The remaining hydroxy groups can be converted, if desired, by obvious reactions either prior to etherfication with epoxy alkoxy groups or after the etherification step. The extent of substitution of epoxy alkoxy groups for hydroxy groups is controlled by the quantity of alkali that is added to the performed phenolic-aldehyde resin in excess haloepoxy alkane.

The curing agents useful in the compositions of the present invention include polyfunctional compounds containing groups reactive with exopy groups such as amines and amides. Obviously the specific choice of active hydrogen containing curing agents will be determined by the desired pot life (the useful life of the mixed components during which they may be used or applied after mixing) and the final properties desired in the cured material. Representative compounds which may be used alone or as mixtures thereof are n-aminopropylmorpholine, 2,2-aminoethylaminoethanol, polyglycolamine, triethylenetetramine, toluenediamine, diethylenetriamine, toluenediamine in aniline, versamids (di and trimerized fatty acids reacted with polyamines such as ethylene diamine), tetraethylene pentamine, penta ethylene hexamine, methyl amino propylamine and isopropyl amino propylamine.

For coating compositions, the solvents include, for example, ketones, esters, or aromatic solvents, such as methyl ethyl ketone, butyl acetate, coal tar naphtha, benzene, toluene, xylene, or mixtures, thereof.

For joint sealers, small amounts of these solvents or cresylic acids may be used.

The inert fillers include mica, asbestos, talc, powdered and flaked glass, slate dust, clay, alumina and Carborundum.

If desired, elastomers or plasticizers which are soluble or dispersible in the tar fraction may be added to impart elasticity. Suitable ones include polyvinyl acetate, polyvinyl chloride, polyvinyl acetate/chloride copolymers, polyvinyl acetals, polyvinyl alcohol, natural and synthetic rubbers, butadiene-acrylonitrile copolymers, butadiene-styrene copolymers, polyethylene polysulfides (Thiokols), nylon and Versamids.

The Versamids function both as curing agents and as plasticizers.

The compositions of the invention may comprise the following parts by weight:

*Example I*

A paste is made of 100 parts epoxidized resorcinol, resorcinol formaldehyde resin described below and 50 parts of butadiene dioxide. A second mixture is made of 140 parts of Versamid 115 (polyamide from ethylene diamine and dilinoleic acid), 16.7 parts of Thiokol LP–8 (polyethylene polysulfide), 16.7 parts of 2,4 toluenediamine. These two pastes are mixed to give an adhesive compound having a pot life of 1½ hrs. The adhesive is coated slabs of aluminum sheets (cleaned) and the two adhesive coated on strips are lapped a predetermined distance of one-half inch. The lapped joints are baked at room temperature for 160 hrs, and tested for shear strength. The joint had a strength at room temperature of 360 p.s.i. and when heated to 100° F. had a strength of 2840 p.s.i.

The resin of Example I is prepared by condensing an excess of epichlorhydrin with a 50–50 molar mixture of resorcinol and resorcinol-formaldehyde resin (1 mol resorcinol/0.6 mol formaldehyde) at 90–100° C. with slow addition of alcoholic caustic, as is described in St. Clair application Serial Number 546,256, filed November 10, 1955 and now matured into U.S. Patent No. 2,892,809. The oxirane oxygen content is 8.8%.

Example II

| | Parts |
|---|---|
| Resin of Example I | 100 |
| Butadiene dioxide | 30 |
| Versamid 115 | 140 |
| Thiokol LP-8 | 14.1 |
| 2,4-toluenediamine | 14.1 |
| Butylene oxide | 10 |
| Pot life, hr. | 1.2 |
| Strength, R. T., p.s.i. | 3385 |
| Strength, 180° F., p.s.i. | 2260 |
| Strength, 67°, p.s.i. | 2680 |
| Bend strength, lbs. total force | 160 |

Example III

| | Parts |
|---|---|
| Resin of Example I | 100 |
| Butadiene dioxide | 20 |
| Versamid 115 | 100 |
| Thiokol LP-8 | 10 |
| 2,4 toluenediamine | 16.8 |
| Pot life, hr. | 1.0 |
| Strength, R.T., p.s.i. | 2805 |
| Strength, 180° F., p.s.i. | 2340 |

Example IV

| | Parts |
|---|---|
| Resin of Example I | 100 |
| Butadiene dioxide | 30 |
| Versamid 115 | 100 |
| Thiokol LP-8 | 10 |
| 2,4 toluenediamine | 16.8 |
| Pot life, hr. | 1.0 |
| Strength, R.T., p.s.i. | 3380 |
| Strength, 180° F., p.s.i. | 3275 |

Example V

| | Parts |
|---|---|
| Resin of Example I | 100 |
| Butadiene dioxide | 20 |
| Versamid 115 | 100 |
| Thiokol LP-8 | 10 |
| 2,4 toluenediamine | 16.8 |
| Asbestine | 20 |
| Pot life, hr. | 1.1 |
| Strength, R.T., p.s.i. | 3435 |
| Strength, 180° F., p.s.i. | 2995 |

Example VI

| | Parts |
|---|---|
| Resin of Example I | 30 |
| Resorcinol diglycidyl ether | 70 |
| Butadiene dioxide | 30 |
| Versamid 115 | 80 |
| Thiokol LP-8 | 20.5 |
| 2,4 toluenediamine | 20.5 |
| Pot life, hr. | 2.5 |
| Strength, R.T., p.s.i. | 2865 |
| Strength, 180° F., p.s.i. | 2900 |

The adhesives of Examples I–VI show evcellent tensile shear strength at low temperature, e.g. 67° F. The adhesives additionally show excellent resistance to attack by moisture, salt spray and solvents.

What is claimed is:

1. A composition that is curable at room temperature to a hard infusible state comprising a fusible epoxy alkoxy phenol aldehyde resin containing at least 3 phenolic groups per molecule and having a molar ratio of epoxy groups to phenolic groups of at most one, an aliphatic polyepoxide, and a solid aromatic polyamine in an amount sufficient to yield 0.8 to 1.4 equivalents of amino hydrogen per equivalent of epoxy groups in said fusible epoxy alkoxy phenol aldehyde resin and said aliphatic polyepoxide.

2. The composition set forth in claim 1 wherein said solid aromatic polyamine is 2,4 toluenediamine.

3. An adhesive composition curable at room temperature to a hard infusible state comprising a fusible epoxy alkoxy phenol aldehyde resin containing at least 3 phenolic groups per molecule and having a molar ratio of epoxy groups to phenolic groups of at most one, an aliphatic polyepoxide, a solid aromatic polyamine in an amount sufficient to yield 0.8 to 1.4 equivalents of amino hydrogen per equivalent of epoxy groups in said fusible epoxy alkoxy phenol aldehyde resin and said aliphatic polyepoxide, and a plasticizer.

4. The composition set forth in claim 3 wherein said solid aromatic polyamine is 2,4 toluenediamine.

5. The composition set forth in claim 3 wherein said plasticizer is a polyalkylene polysulfide.

6. The composition set forth in claim 3 wherein said plasticizer is a polyamide prepared from the condensation of an alkylene diamine and dilinoleic acid.

References Cited in the file of this patent

UNITED STATES PATENTS

| | | |
|---|---|---|
| 2,558,949 | Greenlee | July 3, 1951 |
| 2,658,885 | D'Alelio | Nov. 10, 1953 |
| 2,682,514 | Newey | July 29, 1954 |
| 2,682,515 | Naps | July 29, 1954 |
| 2,705,223 | Renfrew et al. | Mar. 29, 1955 |
| 2,798,833 | Lapsensohn et al. | July 9, 1957 |
| 2,824,083 | Parry et al. | Feb. 18, 1958 |
| 2,853,467 | Bloom et al. | Sept. 23, 1958 |